United States Patent
Dienhart et al.

(10) Patent No.: US 6,357,522 B2
(45) Date of Patent: Mar. 19, 2002

(54) MULTI-CHANNEL FLAT TUBE

(75) Inventors: Bernd Dienhart, Köln; Hans-Joachim Krauss, Stuttgart; Hagen Mittelstrass, Bondorf; Roland Schirrmacher, Ludwigsburg; Karl-Heinz Staffa; Christoph Walter, both of Stuttgart, all of (DE)

(73) Assignee: Behr GmbH & Co., Stuttgart (DE)

( * ) Notice: Subject to any disclaimer, the term of this patent is extended or adjusted under 35 U.S.C. 154(b) by 0 days.

(21) Appl. No.: 09/775,817

(22) Filed: Feb. 5, 2001

Related U.S. Application Data

(63) Continuation-in-part of application No. 09/411,158, filed on Oct. 1, 1999, now abandoned.

(30) Foreign Application Priority Data

Oct. 1, 1998 (DE) .......................... 198 45 336

(51) Int. Cl.[7] .................................. F28F 1/06
(52) U.S. Cl. .................. 165/183; 165/177; 138/38; 138/115
(58) Field of Search ................ 165/177, 183; 138/38, 115, 116, 117

(56) References Cited

U.S. PATENT DOCUMENTS

| | | | |
|---|---|---|---|
| 4,776,177 A | * | 10/1988 | Jancic et al. ............ 165/177 X |
| 5,036,909 A | | 8/1991 | Whitehead et al. |
| 5,307,870 A | | 5/1994 | Kamiya et al. |
| 5,372,188 A | | 12/1994 | Dudley et al. |
| 5,546,656 A | | 8/1996 | Hartman et al. |
| 5,642,775 A | | 7/1997 | Akachi |
| 6,000,467 A | * | 12/1999 | Tokizaki et al. ........ 165/177 X |

FOREIGN PATENT DOCUMENTS

| | | | |
|---|---|---|---|
| DE | 2 217 252 | 10/1973 | |
| DE | 36 01 741 | 10/1986 | |
| DE | 38 43 305 | 6/1990 | |
| DE | 295 02 262 | 8/1995 | |
| IT | 309581 | 7/1933 | ................ 165/177 |
| JP | 406201284 A | * 7/1994 | |

* cited by examiner

Primary Examiner—Leonard Leo
(74) Attorney, Agent, or Firm—Crowell & Moring, LLP

(57) ABSTRACT

A multichannel flat tube for a heat exchanger has a plurality of parallel flow channels aligned in a row, side by side, along a transverse axis of the tube. At least the inner flow channels have oval cross-sections, and major semiaxes of the inner flow channels are inclined relative to the transverse axis of the tube at an acute angle. The flat tube can be designed for high operating pressures with relatively low weight and relatively high heat exchange capability. The construction may be used, for example, in $CO_2$ air conditioners in motor vehicles.

6 Claims, 2 Drawing Sheets

MULTI-CHANNEL FLAT TUBE

This application claims the priority of German application 198 45 336.1, filed Oct. 1, 1998, the disclosure of which is expressly incorporated by reference herein, and is a continuation-in-part of U.S. patent application Serial No. 09/411,158, filed Oct. 1, 1999 now abandoned, the disclosure of which is also expressly incorporated by reference herein.

BACKGROUND AND SUMMARY OF THE INVENTION

The present invention relates to a multichannel flat tube for a heat exchanger, having a plurality of parallel flow channels located side by side in the transverse direction of the tube.

A flat tube of this kind for use in a condenser of a cooling or air conditioning system is known from European patent EP 0 219 974 B1, with the parallel flow channels in the flat tube being formed by a corrugated insert that is placed in the interior of the originally hollow tube made with one channel, and brazed fluid-tight at the points where it contacts the inside wall of the tube. In this manner, flow channels located side by side are produced with a triangular cross-section matching the cross-section of the corrugated insert. The flat tube is designed for use with R12 coolant and similar coolants, in which maximum operating pressures of approximately 20 bars typically occur. In one typical example, the tube wall thickness is 0.381 mm and the extent of the tube in the vertical direction is 1.91 mm. U.S. Pat. No. 5,372,188 teaches, as an alternative to installing a corrugated insert, the manufacture of flat tubes, with a row of channels with triangular cross-sections, from an extruded profile.

In offenlegungsschrift DE 38 43 305 A1 and U.S. Pat. Nos. 3,416,605, and 5,036,909, flat tubes with a plurality of flow channels located side by side with rectangular cross-sections are disclosed, with projections to increase the surface area possibly being provided on the edges of the channels.

An application that has recently gained in significance is heat exchangers for air conditioners, especially in motor vehicles that use coolant R-744, i.e. carbon dioxide. In this case, heat exchanger structures made of rectilinear or serpentine flat tubes are required which reliably withstand operating pressures above 100 bars. Although extruded multichannel flat tubes with flow channels having circular cross-sections and conventional flat non-profiled broad-sided tube outer surfaces have been considered for this application, it turns out that the heat exchange efficiency of these flat tubes requires improvement because of the relatively small heat-transmitting surfaces. The tubes are also relatively heavy for a given heat exchange efficiency.

The technical problem to be solved by the invention is to provide a multichannel flat tube of the type recited at the outset that is suitable for high-pressure applications with operating pressures of more than 100 bars, which is relatively light, and which provides relatively high heat exchange efficiency with a slight pressure drop in the coolant.

One disclosed manner by which this problem is solved is by providing a particularly constructed multichannel flat tube with flow channels with oval cross-sections and/or a corrugated external tube contour that matches the flow channels so that the flat tube is thinner in the vertical direction of the tube between each pair of flow channels than in the area of each flow channel. It turns out that the flat tube can be designed in this way so that, firstly, a relatively high heat exchange surface is available and, secondly, the remaining wall thicknesses are sufficient to provide the bursting strength required of the tube. The multichannel flat tube thus designed exhibits satisfactory heat exchange efficiency in terms of both volume and weight, with a relatively slight pressure drop in the coolant and a low weight. In particular, the multichannel that flat tube can be used for evaporators in condensers or gas coolers as well as internal heat exchangers in $CO_2$ vehicle air conditioning systems. The multichannel flat tube can preferably be manufactured as an extruded flat tube, with the desired oval cross-sectional shape of the individual channels being produced by an extrusion process using suitably shaped dies.

According to one feature, the flow channels are oriented in a specific fashion, depending on the application, so that their major semiaxes lie perpendicularly or parallel to the transverse axis of the tube or are inclined at a specific acute angle relative to this axis.

According to another feature, the multichannel flat tube is designed so that the ratio of the major to the minor semiaxes of its oval flow channels lies between the values of 1 and 2, the ratio of the material cross-sectional area to the cross-sectional area through which flow occurs is between 1.4 and 4.5, in the case of the minor semiaxis of the respective flow channel that lies parallel to the transverse axis of the tube, the ratio of twice the value of the minor semiaxis to the period length of the flow channel row is between 0.4 and 0.9, and/or the ratio of twice the value of the major semiaxis to the flat tube thickness is between 0.4 and 0.8. These value ranges are especially favorable for achieving a high heat exchange efficiency on the one hand and a high bursting strength with the lowest possible weight on the other.

According to yet another feature, the channel edges in the circumferential direction have a path that is smooth and in the shape of an arc or a path that is corrugated or polygonal, the oval cross-section formed by a polygon with at least five, and preferably many more than five, corners. The corrugated or polygonal irregular surface contour, depending on the application, can have advantages from a manufacturing standpoint, especially advantages relating to flow behavior and heat exchange capability in addition to resistance to pressure.

In one preferred embodiment of the invention, a multi-channel flat tube for a heat exchanger has a plurality of parallel flow channels aligned in a row, side by side, along a transverse axis of the tube. At least the inner flow channels have oval cross-sections, and major semiaxes of the inner flow channels are inclined relative to the transverse axis of the tube at an acute angle. The acute angle is preferably about 45°, and each outermost flow channel of the plurality of flow channels preferably has a circular cross-section.

Most preferably, in this particularly embodiment, a ratio of the major semiaxes lengths to the minor semiaxes lengths of the flow channels which have oval cross-sections is between 1.2 and 1.4, a ratio of material cross-sectional areas to cross-sectional areas of the flat tube through which flow can occur is between 1.0 and 4.0, a ratio of twice the value of each minor semiaxis length to a periodicity length of the row of flow channels is between 0.5 and 0.7, and a ratio of twice the value of each major semiaxis length to the tube thickness is between 0.6 and 0.8. Oval cross-sectional edges of the flow channels can be corrugated or can be formed of individual linear sections that form a polygon with at least five corners.

BRIEF DESCRIPTION OF THE DRAWINGS

Advantageous embodiments of the invention are shown in the drawings and will be described below.

DESCRIPTION OF THE PREFERRED EMBODIMENTS

Figure 1:
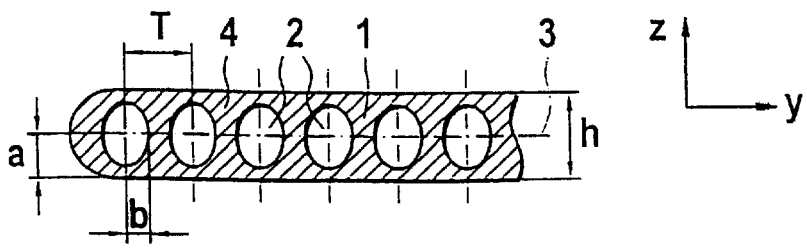
FIG. 1 is a partial cross-sectional view of a multichannel flat tube with oval flow channels having major semiaxes which run perpendicularly to the transverse axis of the tube.

A left area of a cross-section of the multichannel flat tube 1 is shown in FIG. 1. The multichannel flat tube incorporates a number of parallel flow channels 2, which are arranged side by side in the cross-sectional direction y and are separated from one another in a row, and have an oval, essentially elliptical, cross-sectional shape. The flow channels 2 are offset and parallel, and are oriented so that the major semiaxis a of their oval cross-sections runs perpendicularly to the transverse direction y of the tube and hence parallel to the vertical direction z of the tube, while the minor semiaxis b lies parallel to the transverse direction y of the tube in a central lengthwise plane 3 of the flat tube 1.

The dimensioning of flat tube 1, especially of its oval flow channels 2 on the one hand and the tubular bodies 4 surrounding them on the other hand, is chosen so that the flat tube 1 firstly meets the bursting strength requirements imposed on heat exchangers for $CO_2$ air conditioners in motor vehicles and secondly achieves a low weight and a high heat exchange efficiency. For this purpose, the ratio a/b of the major semiaxis a to the minor semiaxis b of the channel cross-section is chosen in the range between 1 and 2, while the ratio of the major diameter 2a of the channel cross-section to the tube thickness h, in other words to its length in the vertical direction z of the tube, is between 0.4 and 0.8. The ratio of the minor diameter 2b of the channel cross-section to the periodicity length or division T, in other words the distance between the midpoints of the cross-sections of each pair of adjacent flow channels 2, is chosen to be between 0.4 and 0.9. In absolute numbers, the tube thickness is typically between 1.5 mm and 4.2 mm, the major semiaxis a typically measures between 0.4 mm and 1.2 mm, the minor semiaxis b measures between 0.4 mm and 1 mm, and the division T is between 1 mm and 3.5 mm. The hydraulic diameter of the individual flow channels 2 or, in other words, the ratio of the multiple of the cross-sectional area to the internal circumference, is typically between 0.9 mm and 2.0 mm. For the abovementioned dimensions, the ratio of the material cross-section, in other words the cross-section of the tube body, to the cross-section through which flow can occur freely, in other words the total cross-sectional area of all the flow channels 2, is between 1.4 and 4.5. The wall thickness of the tube 1 is usually approximately between 0.2 mm and 0.6 mm, and even slightly more than 1 mm in individual cases.

When so designed the multichannel flat tube 1 is especially suitable as a straight tube for a parallel flow heat exchanger or as a serpentine tube for heat exchangers of the serpentine type. The multichannel flat tube 1 is particularly suitable for use in evaporators and gas coolers such as the condensers in $CO_2$ air conditioners. It turns out that multichannel flat tubes with such dimensions can reliably withstand the operating pressures of $CO_2$ air conditioners, which can reach values of more than 100 bars, and at the same time are relatively light in weight and offer comparatively high heat exchange efficiency.

Figure 2:
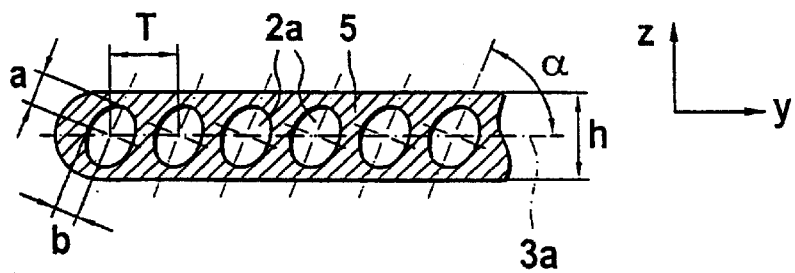
FIG. 2 is a partial cross-sectional view of a multichannel flat tube with oval flow channels having major semiaxes which run at an angle to the transverse axis of the tube.
Figure 3:
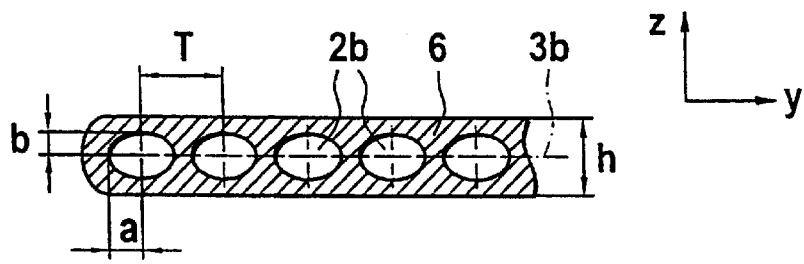
FIG. 3 is a partial cross-sectional view of a multichannel flat tube with oval flow channels having major semiaxes which run parallel to the transverse axis of the tube.

FIGS. 2 and 3 show variations on the flat tube in FIG. 1 with a different orientation of the individual flow channels. In the multichannel flat tube 5 shown in FIG. 2, a row of parallel flow channels 2a are spaced apart in a row and located next to one another in the transverse direction 3a of the tube. Each channel is provided with an oval cross-section in which the major semiaxis a runs diagonally to the transverse direction of the tube 3a. In other words a specific angle α is enclosed between the transverse direction and the major semiaxis a that is larger than 0 degrees and smaller than 90 degrees. Comparable dimensioning possibilities are obtained for both this multichannel flat tube 5 as well, and the case flat tube 1 in FIG. 1. The flat tube 5 shown in FIG. 2 also exhibits essentially the same advantages regarding high bursting strength, heat exchange efficiency, and low weight.

In the multichannel flat tube 6 shown in FIG. 3, a plurality of parallel flow channels 2b is located so that the channels are spaced apart in a row in the transverse direction 3b of the tube and lies side by side. In this case, however, each channel is oriented with the major semiaxis a parallel to the transverse direction 3b of the tube. This version of the flat tube is especially suited for applications for which a flat tube with a limited thickness is desirable. In addition, it turns out, as is evident to the individual skilled in the art; that in the case of this flat tube 6, the dimensioning possibilities mentioned above in connection with flat tube 1 in FIG. 1 also apply to this flat tube 6, with the roles of the major semiaxis a and the minor semiaxis b relative to flat tube 1 in FIG. 1 being reversed; in the flat tube 6 in FIG. 3, the major semiaxis a corresponds in position to the minor semiaxis b of the flat tube 1 in FIG. 1 and the position of the minor semiaxis b corresponds to that of the major semiaxis a of flat tube 1 in FIG. 1.

Figure 4:
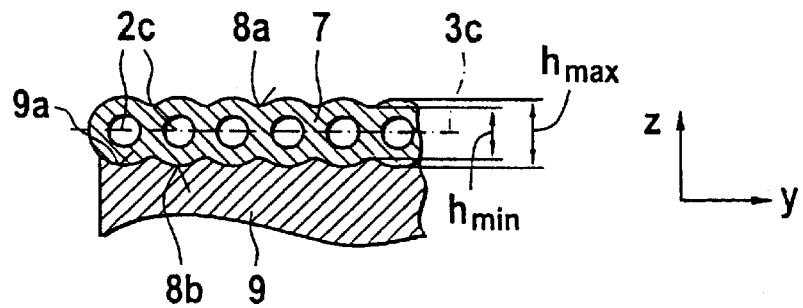
FIG. 4 is a partial cross-sectional view of a multichannel flat tube with flow channels with a circular cross-section and matching external surfaces of the tube as well as accordingly shaped corrugated ribs.

FIG. 4 shows a multichannel flat tube 7 with flow channels 2c arranged in a row in the transverse direction 3c of the tube, spaced apart from one another, and located side by side. These channels have circular cross-sections. This channel shape is favorable for high pressure strength. In order to obtain a high heat exchange capability as well, this flat tube has a particular profile of the outer surfaces 8a, 8b of the two wide sides of the flat tube that corresponds to the arrangement of flow channels 2c. This profile of the outer surfaces 8a, 8b is in the shape of a sine wave in the cross-section shown, with the periodicity corresponding to the arrangement of the flow channels being chosen such that flat tube 7 has a maximum thickness hmax in the area of each flow channel and a minimum thickness hmin in the middle between each pair of individual flow channels. By this measure, the surface of the tube is increased and, at the same time, the distance thereof from the internal flow channels 2c as compared with a flat design of the tube outer surface is reduced, improving the heat exchange efficiency. At the same time, a sufficient wall thickness remains between flow channels 2c and the outer surfaces 8a, 8b of the tube to withstand operating pressures up to 150 bars, so that this flat tube 7, in the same way as flat tube A in FIGS. 1 to 3, can be used for heat exchangers in $CO_2$ air conditioners.

To construct a tube/fin block like that conventionally used in heat exchangers in air conditioners, using the externally profiled flat tube type 7 according to FIG. 4, whether they are straight flat tubes or serpentine flat tubes, a suitably contoured corrugated rib type 9 can be provided as shown in FIG. 4. The corrugated rib 9 used is provided over its entire length or at least in the area of its peaks in the transverse direction with a corrugated contour 9a with a periodicity which corresponds to that of the corrugated tube exteriors 8a, 8b. In this manner, as can be seen from FIG. 4, the peaks of the cross-sectional contour 9a of the corrugated fin peak areas fit into the valleys of the respective adjoining flat tube 7. This prevents the corrugated ribs 9 inserted between the flat tube layers of the tube/fin block from sliding away from tube 7 even before they are permanently connected, for example by hard brazing. This facilitates the assembly of the tube/fin block, especially in those cases in which the entire block with the flat tubes 7 and corrugated fins 9 is initially installed loosely between the tube layers and only later is connected to form a solid block structure in a single brazing process. In addition, the interlocking of the transverse wave structures of the flat tube 7 on the one hand and the corrugated fins 9 on the other provides favorable heat exchange between the two elements and thus improves the heat exchange efficiency of the tube/fin block.

Figure 6:
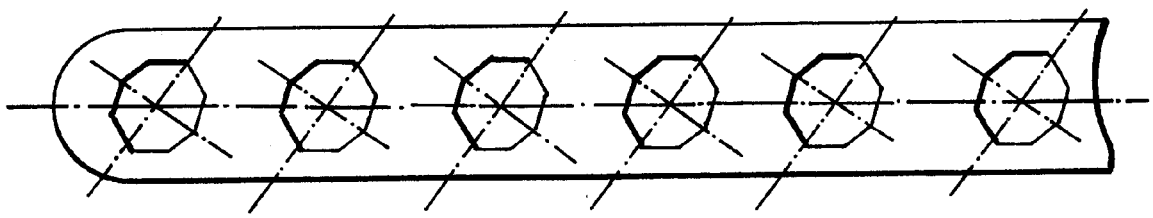
FIG. 6 is a partial cross-sectional view of a multichannel flat tube with polygonal circumferential channel edges.
Figure 7:
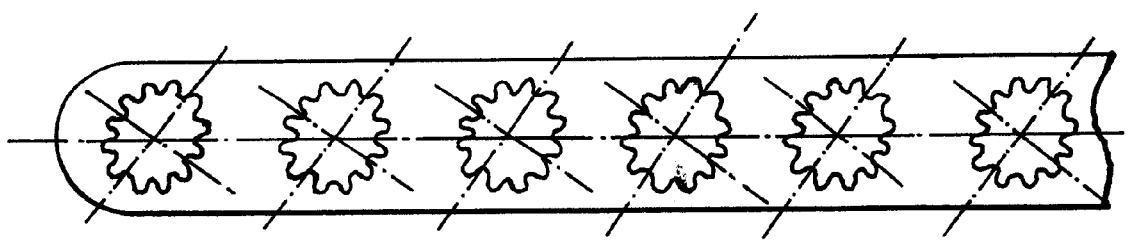
FIG. 7 is a partial cross-sectional view of a multichannel flat tube with corrugated circumferential channel edges.

Of course, if necessary, the flat tubes in FIGS. 1 to 3 can also be provided with a corrugated external transverse contour such as that of the flat tube 7 in FIG. 4 and can be provided with suitably transversely contoured corrugated fins corresponding to the corrugated fin type 9 in FIG. 4 for constructing the tube/fin block together with such transversely contoured flat tubes, with the same advantages as mentioned above in connection with the embodiment shown in FIG. 4. In addition, it is possible, as shown in FIGS. 6 and 7, to have a corrugated or polygonal circumferential channel edge with at least five corners instead of providing the indicated smoothly arched pattern of the circumferential edges of the channels. In other words the channel cross-section can have a corrugated oval edge as shown in FIG. 7 or oval polygonal design made of linear segments adjoining one another as shown in FIG. 6. These variations then have advantages from the standpoint of manufacturing techniques or advantages regarding heat exchange efficiency and burst strength.

Figure 5:
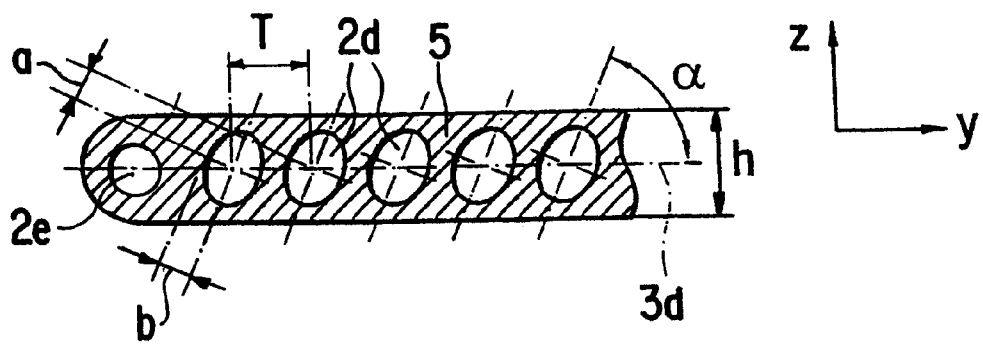
FIG. 5 is a partial cross-sectional view of a multichannel flat tube similar to that of FIG. 2 but with each outermost flow channel having a circular cross-section.

FIG. 5 illustrates an embodiment in which the major semiaxes at least of the inner flow channels are inclined relative to the transverse axis or direction 3d of the tube at an acute angle $\alpha$ (with $0<\alpha<90°$). The two outer flow channels, i.e. the leftmost flow channel 2e and the corresponding rightmost flow channel (not shown), are formed with circular cross-sections. The other, inner flow channels 2d are formed with oval cross-sections and inclined major semiaxes in a manner similar to the flow channels 2a of FIG. 2.

Calculations have led to the conclusion that, starting with the embodiment shown in FIG. 1, in which each of the major semiaxes is inclined relative to the transverse axis of the tube by an angle $\alpha$ of 90°, decreasing this inclination $\alpha$ increases the free cross-sectional area of the flow channels up to 15% with a simultaneous reduction in weight of the multichannel flat tube. It turns out that, in this respect, an optimal angle of about $\alpha=45°$ exists. One condition which always has to be satisfied is that a tube wall thickness must be sufficient to withstand the pressure of the medium directed through the flow channels. This pressure can be quite high, for example, in a cooling or air-conditioning system using $CO_2$ as a coolant. Inclining the oval cross-sections of the flow channels results in a maximum inner flow cross-section and minimal tube weight while retaining the ability of the tube to withstand a given maximum pressure.

Providing the two outer channels with a circular cross-section, while keeping the inclined oval cross-sections for the other channels, increases rupture and bursting strength. This is of particular importance in embodiments in which the tube is bent, e.g. by 180° (as used, e.g., for heat exchanger arrangements in which both ends of each of a plurality of multichannel flat tubes arranged in a tube block are positioned at one block side). Such bending of the tubes often weakens the wall thickness between the respective outer channel and the outside. This makes it preferable to use circular rather than oval outer channels, while for the other, inner, channels, the advantages of having oval, inclined channels are maintained.

Referring again to FIG. 5, preferably, the acute angle is about 45°, a ratio of the length "a" of the major semiaxes to the length "b" of the minor semiaxes of the flow channels 2d which have oval cross-sections is between 1.2 and 1.4, a ratio of material cross-sectional areas to cross-sectional areas of the flat tube through which flow can occur (i.e., the areas of the channels 2d and 2e) is between 1.0 and 4.0, a ratio of twice the length "b" of the minor semiaxes to a periodicity length T of the row of flow channels is between 0.5 and 0.7, and a ratio of twice the length "a" of the major semiaxes to the tube thickness "h" is between 0.6 and 0.8. Oval cross-sectional edges of the flow channels can be either corrugated or formed of individual linear sections that form a polygon with at least five corners.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Multichannel flat tube for a heat exchanger, with a plurality of parallel flow channels aligned in a row side by side along a transverse axis of the tube, wherein at least inner flow channels have oval cross-sections, major semiaxes of the inner flow channels being inclined relative to the transverse axis of the tube at an acute angle.

2. Multichannel flat tube according to claim 1, wherein the acute angle is about 45°.

3. Multichannel flat tube according to claim 1, wherein each outermost flow channel of said plurality of flow channels has a circular cross-section.

4. Multichannel flat tube according to claim 1, wherein a ratio of the major semiaxes to minor semiaxes of the flow channels which have oval cross-sections is between 1.2 and 1.4, a ratio of material cross-sectional areas to cross-sectional areas of the flat tube through which flow can occur is between 1.0 and 4.0, a ratio of twice the value of the minor semiaxes to a periodicity length of the row of flow channels is between 0.5 and 0.7, and a ratio of twice the value of the major semiaxes to the tube thickness is between 0.6 and 0.8.

5. Multichannel flat tube according to claim 1, wherein oval cross-sectional edges of the flow channels are made corrugated.

6. Multichannel flat tube according to claim 1, wherein oval cross-sectional edges of the flow channels are formed of individual linear sections that form a polygon with at least five corners.

* * * * *